United States Patent Office 3,218,852
Patented Nov. 23, 1965

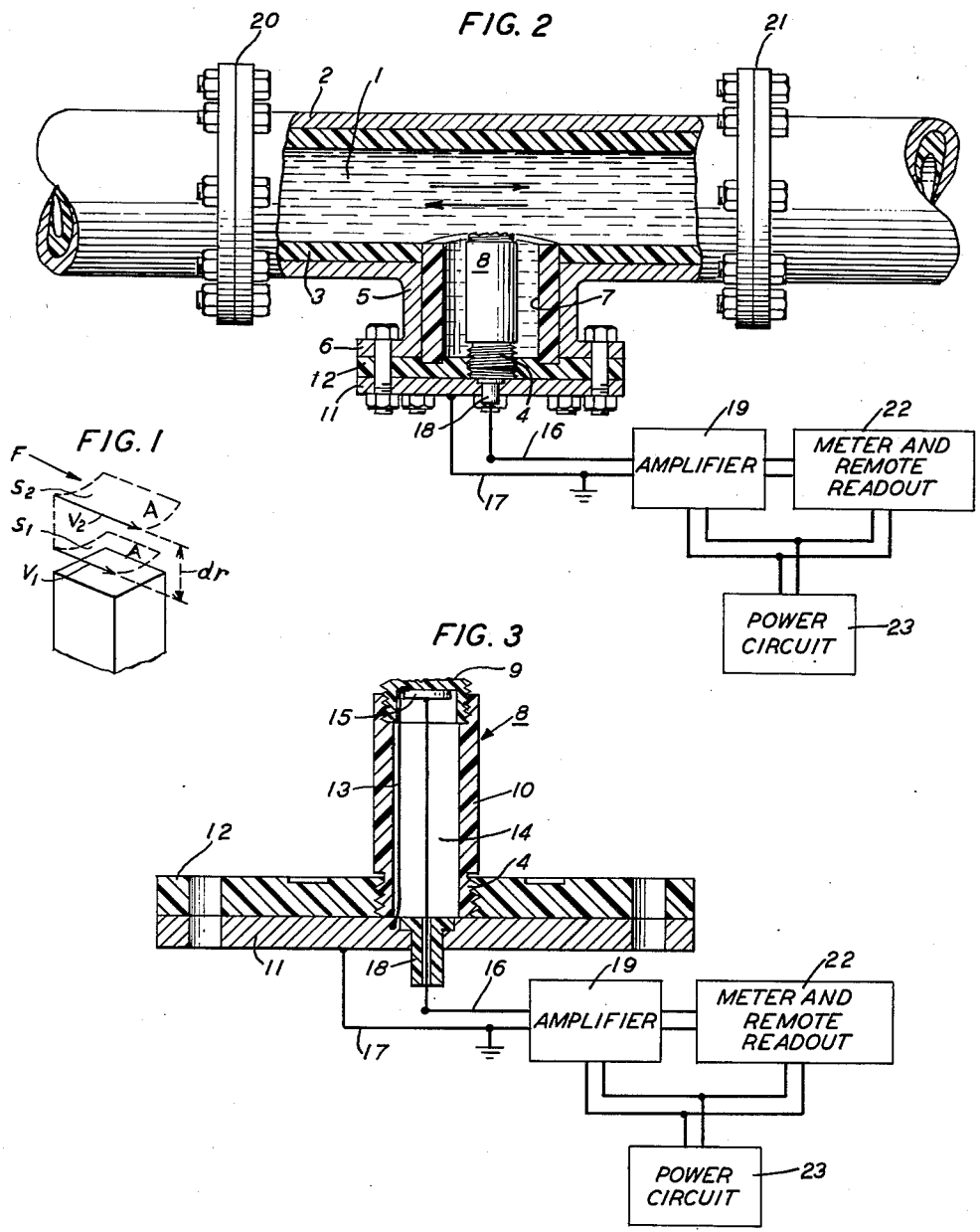

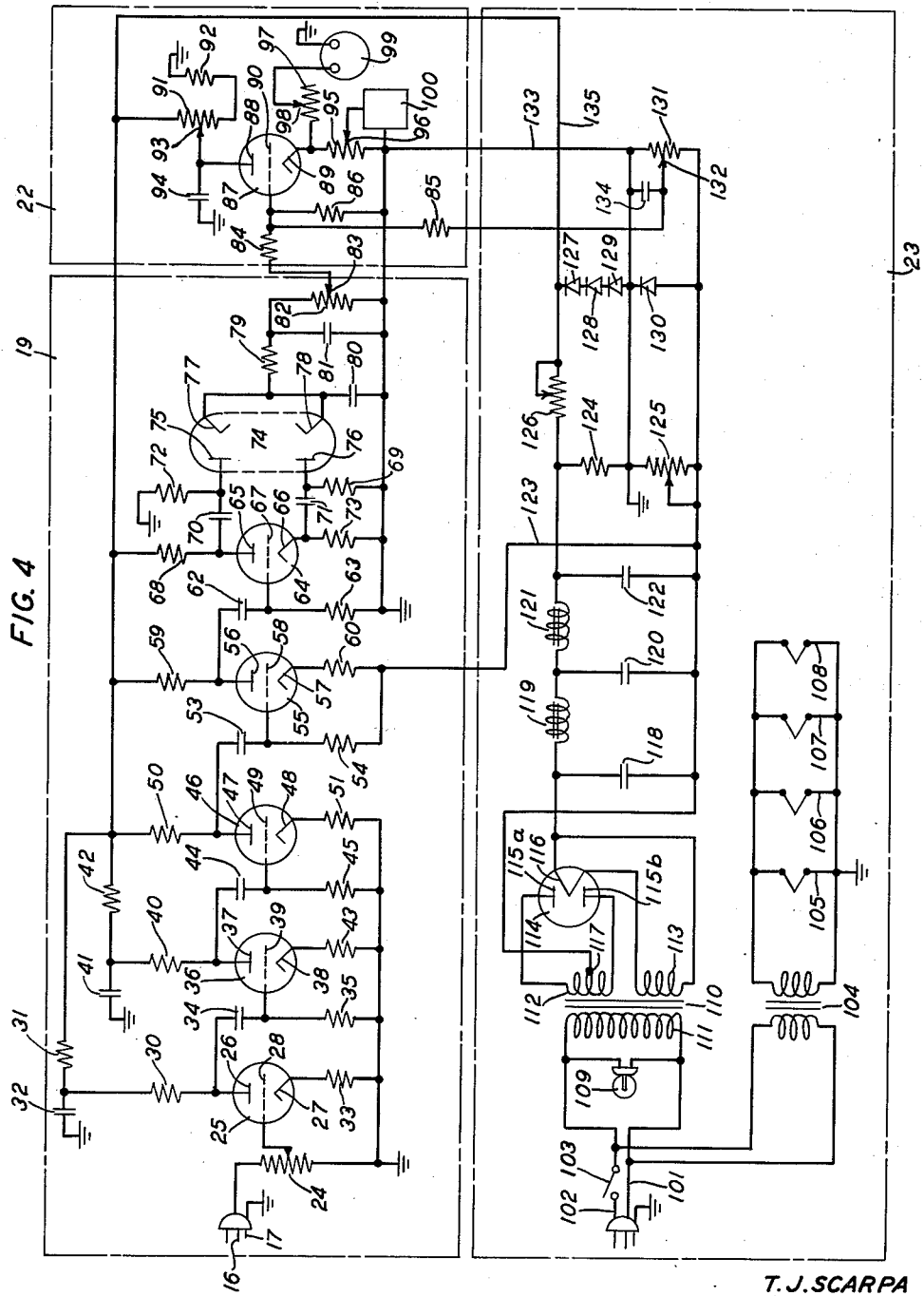

3,218,852
FLOWMETERS
Thomas J. Scarpa, Metuchen, Gerard G. Gibney, Raritan, and Bernard P. Scarpa, Jersey City, N.J., assignors, by mesne assignments, to Edison Instruments, Inc., Rahway, N.J.
Filed Apr. 4, 1962, Ser. No. 185,137
21 Claims. (Cl. 73—194)

This invention relates in general to methods and apparatus for measuring the flow of fluids in a pipe; and more particularly, to a fluid-shear type of flowmeter.

The most common types of flowmeters in the prior art are those making use of mechanical vanes driven to rotate by the passing fluid. These have the disadvantage that the energy consumed in rotating the vane may change or interfere with the flow which the meter attempts to measure. Moreover, the presence of undissolved particles in the fluid to be measured, as in many industrial applications, impedes the action of flowmeters of this type.

In recent years, a new type of flowmeter has been introduced which relies for its operation on one or more ultrasonic beams which are generated by an outside source and impressed on the moving fluid; and subsequently detected at one or more points along the path of flow. However, difficulties in calibration often arise in this type due to the non-linearity of the response, spurious reflections of the beam, or variations in the frequency of the impressed waves due to changes in internal or external conditions, all of which must be compensated for to produce an accurate reading.

Furthermore, many of the prior art devices, both of the mechanical and non-mechanical types, respond poorly, if at all, to fluids flowing at low velocities, or to fluids of high viscosity.

Some of the prior art devices which attempt to overcome one or more of the aforementioned disadvantages have complex structures or circuitry which are in themselves disadvantageous because they are cumbersome to set up, calibrate, and operate.

It is accordingly a principal object of the present invention to provide a fluid flowmeter of simplified structure and operation which functions with greater facility than those of the prior art.

A more particular object of this invention is to provide a flowmeter in which the response is a substantially linear function of the velocity under measurement, and which can be readily translated to read in terms of mass flow.

Another object of the present invention is to provide a flowmeter which is accurate over a wide range of conditions, and particularly as applied to fluids moving at low velocities, fluids of high viscosity, and also fluids containing large numbers of undissolved particles.

A further object of the invention is to provide a flowmeter which, in certain of its preferred embodiments, is impervious to attack by acids and other chemicals in the fluids under measurement.

These and other objects are attained in accordance with the present invention in a device which relies for its operation on the detectable noise generated by shearing action in a fluid as it passes in contact with the head of a transducer interposed into the pipe or other enclosure in which the fluid is flowing. It has been shown by experiment in accordance with the present invention that such noise is characterized by a broad frequency spectrum, and varies in intensity as a linear function of the velocity of the test fluid.

Also in accordance with the present invention, it has been found that the noise so generated is intensified by employing special geometry within the conduit to increase the frictional forces which the fluid encounters when passing across the face of the detecting transducer. A particular feature of the invention is the fabrication of a special pipe-section to control frictional factors, by lining it with a material which is a poor acoustical conductor, such as rubber or plastic, so that spurious noise is not coupled through the pipe walls to the detecting transducer. the latter is thereby isolated from all other noise-producing disturbances except the shearing action of the passing fluid which it is desired to detect. The detecting transducer is coupled to a high-gain, resistance-capacitance coupled noise amplifier, followed by a rectifier and filter network, whereby the noise signal thereby detected is amplified, rectified, and integrated to produce a direct current component which represents the average value of the power contained within the noise spectrum generated by the shearing action of the flowing fluid. This direct current signal, which is a linear function of the velocity of the fluid flowing in the conduit, is impressed on a direct current power indicating circuit, which may be calibrated either in terms of velocity or of mass flow.

Another feature of the device of the present invention is its simplicity of construction, in that it relies for its operation on a single detecting transducer. In one embodiment of the invention, the transducing probe is mounted in a well or T-section machined into the principal pipe-section of the flowmeter which is adapted to be bolted or otherwise interposed in fluid-tight connection with the conduit in which the velocity of the fluid is to be measured. For mounting the probe, a screw-fitting is provided at the base of the well or T-section so that the probe may be adjusted either to protrude into the center of the pipe, or to assume alternative positions less protruding, or even flush with or slightly recessed with respect to the inner surface of the pipe, depending on the point at which the probe operates with desired sensitivity to the noise of shear action as the fluid moves adjacent the probe surface. The probe-head, which functions principally to protect the surface of the electroacoustic transducer element bonded to its under side, may be a plastic, such as polyvinyliden ("Saran"), or epoxy resin, ceramic glaze, or any other material which forms a thin but tough protective coating readily conductive of compressional waves. This includes stainless steel and other metals, if the fluid is non-corrosive. The sensitivity of the probe-head to the shearing noise of the passing fluid is enhanced by cross-hatching the surface. The body of the probe, which functions principally to support the head in transducing contact with the fluid, to isolate it from spurious noise, and to serve as a conduit for the transducer leads, may be formed of a hollow cylinder of plastic, such as polyvinyliden ("Saran"), or other suitable material.

Both the principal pipe-section and the well or T-section in which the probe is mounted are lined with material having a specific acoustic resistance which may be less than one-half, but which is preferably less than one-tenth that of the pipe shell. Rubber and polyvinyliden (known by the trade-name "Saran") are two examples of materials which have been found suitable for this purpose. The hollow probe in this embodiment is supported on a steel plate bolted onto a flange on the outer edge of the casing well or T-section, a piece of the rubber or plastic pipe lining material being sandwiched between the flange and the plate. The transducer leads are coupled through fluid-tight, shielded connections to the amplifier, rectifier, and indicator circuits.

In accordance with a modified form of the invention, the flowmeter pipe-section includes no T-section or arm, the detecting probe being set directly into a fluid-tight screw-fitting in the wall of the pipe. In this embodiment, the probe-head which is a piezoelectric crystal wafer protected with an epoxy coating, is supported on a body which comprises a metal shell of circular cross-section, filled with epoxy resin, and terminating in a screw at its outer end, so that, as in the other embodiment, the degree of protrusion or recess of the probe-head with respect to the inner pipe wall is readily adjustable.

From the foregoing, it is apparent that principal features of the flowmeter of the present invention are the linear relation of its response to the velocity of flow, the simplicity of construction, and the facility with which it may be adjusted for maximum sensitivity or to interpose a minimal obstruction in the path of the flow.

Other features are that it commences to read at very low fluid velocities, at which prior art flowmeters would be inoperative; and that it is particularly adaptable to the flow-velocity measurement of high viscosity fluids, and those including undissolved particles in the flow.

Another feature of the invention is that in the preferred embodiments the elements in contact with the fluid under measurement are protectively coated, making them impervious to attack by acids or other chemicals in the fluid.

In addition, other objects, features, and advantages of the present invention will be apparent to those skilled in the art, and will be more clearly understood from a study of the specification hereinafter with reference to the attached drawings, in which:

FIG. 1 is a diagram referred to in explaining the theory of operation of the present invention;

FIG. 2 is a showing in longitudinal cross-section of the flowmeter pipe-section of one embodiment of the present invention with interposed detecting element, and the electrical output circuit indicated in block diagram;

FIG. 3 is an enlarged showing of the detecting probe 8 of FIG. 2, with the attendant electrical circuit in block diagram;

FIG. 4 is a detailed schematic showing of the amplifier, indicator, and power circuits indicated in block diagram in FIGS. 2 and 3;

Figure 5:
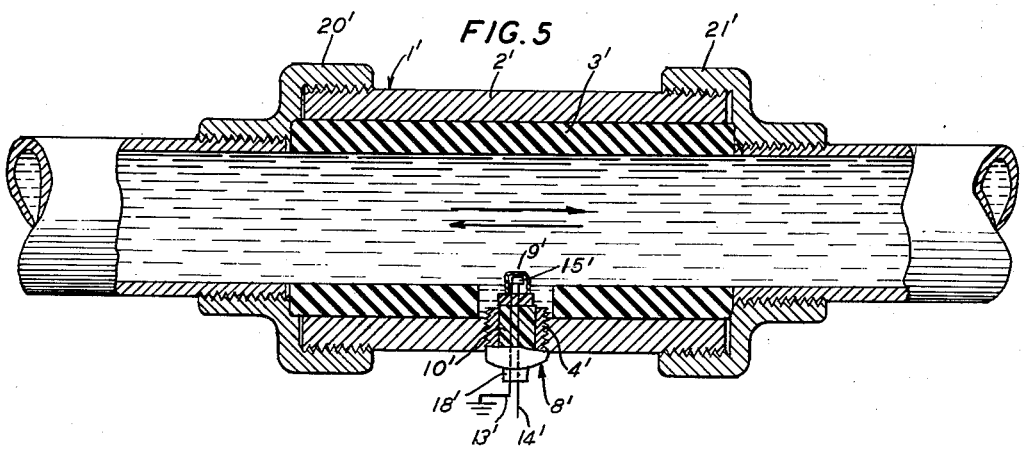
FIG. 5 shows in longitudinal section an alternative embodiment of the present invention, including the flowmeter pipe-section and the interposed detecting element.

The following appears to be a plausible theoretical explanation for the operation of the fluid-shear flowmeter of the present invention.

Referring to FIG. 1 of the drawings, assume that fluid is impelled to move in a pipe at a velocity $v_x$; and that $S_1$ is a small plane in the fluid approximately parallel to the inner surface of the pipe, and having an area A; and that $S_2$ is a second small plane in the fluid, also of area A, which is parallel to $S_1$, but removed a radial distance $dr$ toward the center of the pipe. Assuming the fluid has some viscosity, the fluid in the plane $S_2$ will be moving at a greater velocity $v_2$ than the velocity $v_1$ with which the fluid at $S_1$ is moving. The shearing stress which causes this disparity in the velocities of the two layers $S_1$ and $S_2$ is represented by $F/A$ (not to be confused with pressure). Then:

$$v_2 - v_1 = dv_x \quad (1)$$

where the latter represents the change in velocity in a radial direction in the pipe due to fluid shear. It follows that $dv_x/dr$ equals the rate of change of velocity $v_x$, or the rate of fluid shear, which is proportional to the shearing stress. Hence, $$F/A = k\, dv_x/dr \quad (2)$$

where $k$ is the coefficient of viscosity.

But in the manner of stretched rubber bands, potential energy is built up in the molecular bonds between the layers of fluid flowing in $S_1$ and $S_2$, which opposes the shearing force. The increment of potential energy is equal and opposite to the shearing force multiplied by the distance between layers $S_1$ and $S_2$; hence:

$$dQ = -F\,dr \text{ or } F = -dQ/dr \quad (3)$$

Substituting the above in Equation 2:

$$\frac{-dQ}{A\,dr} = \frac{k\,dv_x}{dr} \text{ or } dQ = -Ak\,dv_x \quad (4)$$

In other words, at any point, moving in a radial direction from the inner periphery of the pipe to its center, the change in potential energy is equal but opposite in sign to the change of $v_x$ in a radial direction.

Integrating Equation 4 over the lenght of the radius:

$$Q = -(Akv_x + C) \quad (5)$$

where C is a calibration constant representing the condition when $v_x$ equals zero.

The noise energy $Q_n$ emitted by the snapping of the molecular bonds as the viscous fluid along the pipe bears a linear relation to the total potential energy Q stored in the bonds by the shearing action. Accordingly, the above equation may be simply modified to present a fair representation of the relationship between the emitted noise energy $Q_n$ and the velocity of fluid in the pipe, $v_x$.

$$Q_n = +(A'kv_x - C') \quad (6)$$

where $A'$ and $C'$ are new calibration constants. (Inasmuch as the sound output is rectified and integrated in an electrical circuit, the negative sign, which merely relates to phase, may be omitted.) From the above, it is seen that the slope of the calibration curve is also a linear function of $k$, the viscosity of the fluid, the slope increasing for fluids of greater viscosity.

It will be understood that the foregoing explanation is merely one hypothesis of the theory underlying the present invention, the correctness of which is immaterial to the invention disclosed, inasmuch as the actual linear relationship between the noise response picked up by a transducer interposed in the stream of passing fluid, and the velocity of the fluid were arrived at empirically and have been repeatedly verified by experiment.

FIG. 2 shows one of several practical embodiments of the present invention which were constructed and test-operated, actual dimensions and other details for two of the structures in accordance with FIG. 2 being indicated under columns A and B in Table I hereinafter.

In FIG. 2, a section 1 of pipe is broken away to show a longitudinal section of the interior which extends between a pair of flanges 20 and 21, which section includes a fluid-shear flowmeter in accordance with the present invention. Each of flanges 20 and 21 is bolted in fluid-tight connection with a matching flange in a contiguous section of a pipe system wherein the flowmeter is interposed to measure the fluid velocity. For the purposes of the present invention, the pipe shell 2 may be of steel or lead, or any other metal suitable for transporting the fluid under test, or it may be of a non-metallic material such as, for example, a plastic like polyvyliden, known in the art by the trade name "Saran," in which case the pipe-section would be unlined. In each case, the thickness of the pipe shell 2 is determined by the pressure of the fluid under test in accordance with well-known hydrodynamical principles. In preferred embodiment, where the shell 2 is metal, the inner surface thereof is lined with a viscoelastic material; that is, a material the shear modulus of which is non-Newtonian, whereby it readily propagates compressional waves through its thickness, but imposes high losses on shear waves picked up within the pipe cavity. The material of the lining 3 should have a specific acoustic resistance of less than one-half, and preferably, less than one-tenth that of the pipe shell. Sheet rubber, about one-quarter inch thick, has been found to be a preferred material for this purpose. Numerous other materials have been found suitable, including plastics, such as polyvinyliden, known by the trade name "Saran"; polyamide, known as "nylon"; polytetrafluoride, known by the trade name "Teflon"; thermoplastics, such as polyethylene and polypropylene; the polyesters; and various types of foams, including polystyrene and polyurethane foams. The foregoing list is not to be construed as restrictive, but is merely to indicate the type of materials useful for this purpose. In general, when rubber is used as a lining material, good results have been realized in the operation of the present invention by leaving it unbonded to the outer shell. For example, flanged metal rings (not shown) may be interposed on the inner periphery at each of the ends of pipe-section 1, to hold the rubber lining in place. In other cases, satisfactory results have been attained where the lining material 3, comprising, for example, polyvinyliden ("Saran"), is securely bonded to the inner surface of the steel pipe with a thin layer of epoxy resin, or some similar bonding agent. The fluid-shear flowmeter of the present invention is operative when lining 3 is omitted altogether; but with substantially impaired efficiency.

Midway between the flanged ends 20 and 21 of pipe-section 1, is a T-section or well 5, of the same material as the principal pipe shell 2, and machined integrally therewith, which protrudes with its axis normal to the principal axis of pipe-section 1. The T-section or well 5 terminates in a flange 6, which is bolted in fluid-tight connection to a matching terminal-plate 11, a layer 12 of polyvinyliden ("Saran"), or similar viscoelastic material being sandwiched between the flange 6 and terminal-plate 11. In some embodiments of the invention, depending on whether the fluid under test is corrosive, the T-section or well 5 has a lining 7 matching in thickness and composition the lining 3 of the principal pipe-section 1. In other embodiments, the lining 7 is omitted altogether.

A hollow cylindrical probe 8, which functions to pick up the noise signals generated as the fluid in pipe-section 1 moves past its head, is mounted in the well or T-section 5, so that the two are concentric. FIG. 3 of the drawings is an enlarged cross-sectional showing of the probe 8. The base of probe 8 which terminates in a screw, is mounted on a screw-fitting 4 which may extend through the lining 12 into the metal base-plate 11. The position of the probe 8 is adjustable in the screw-fitting 4 so that the probe-head 9 may be raised or lowered with respect to the inner lining 3 of the principal pipe-section 1. In preferred embodiment, it is adjusted to project about .01 of an inch beyond the inner lining surface of the principal pipe-section 1, into the stream of passing fluid. The flowmeter of the present invention has been found to be operative with the probe 8 interposed so that its head 9 is in contact with the center of the flowing stream; or, alternatively, with the probe-head 9 withdrawn so that it is flush with the inner wall of the lining 3, or actually slightly recessed with respect thereto. In each case, depending on a number of factors, including the velocity of flow of the fluid, its volume, density, and viscosity, a position of adjustment for probe 8 is arrived at empirically, at which the sensitivity of the instrument is maximized.

The head 9 of the probe 8 functions principally to protect the sensitive surface of the electroacoustic transducing element 15. It may be formed of a layer of plastic such as polyvinyliden ("Saran"), about one-tenth of an inch thick, or alternatively, any one of a number of other materials which are so characterized that they readily couple the compressional waves generated by the noise of the passing fluid to the transducer element 15, and are impervious to chemical reaction or corrosion by it. In embodiments in which the fluid under test is not chemically active, a thin layer, about one-tenth of an inch thick, of stainless steel has been found to function as a suitable acoustic coupler for use on head 9. Other suitable materials are epoxy resins, various types of plastics and ceramic glazes which have good acoustic coupling characteristics, and even a thin layer of silicone rubber, although the latter causes the meter to operate at reduced sensitivity. In order to increase the sensitivity of the probe 8, the face of head 9 in contact with the passing fluid may be roughened to increase its Reynolds number by, for example, cross-hatching the surface with a sharp tool. Devices of the present invention have been found operative at increased sensitivities when the Reynolds number of the surface has been increased up to and beyond the range 2000 to 4000 where turbulence sets in. On the other hand, for some applications in which the velocity or viscosity of the tested fluid is high, it has been found unnecessary to increase the roughness of the surface of head 9 beyond that present when the material is in its ordinary commercial state.

A piezoelectric transducer 15 of any of the types well-known in the art is bonded by means of an epoxy resin, or other acoustic bonding agent, to the underside of the head 9. Whereas a ceramic wafer of lead zirconate titanate has been found suitable for the purposes of the embodiment under description, it will be apparent to those skilled in the art that numerous other piezoelectric materials, either in the form of single crystals or ceramics, in various chemical and physical combinations well-known to the art may serve as electroacoustic transducers suitable for the purposes of the present invention. Prior to installation, the transducing wafer 15 is properly aged and oriented so that it vibrates principally in a longitudinal-thickness mode. Electrodes are applied by evaporating or otherwise applying conducting metal films on opposite surfaces of the wafer 15 in a manner well-known in the art. In accordance with one alternative, the layer of epoxy resin utilized in bonding the electroacoustic wafe 15 to the underside of head 9 may contain comminuted silver in the mixture thereof; and, a similar coating of conducting epoxy may be used on the underside of the wafer 15, making any additional electrode coatings unnecessary. Signal lead 14 is conductively bonded to the under electrode of transducer wafer 15 by means of silver solder or the like, whereas the ground lead 13 is similarly bonded to the upper electrode.

As an added feature in certain of the embodiments, an annular ring of plastic acoustical decoupling medium may be interposed in the space between the probe-head 9 and the inner surface of the well 5, adjacent the transducing wafer 15.

The body 10 of the probe-head 9 may, for example, be a hollow cylinder of polyvinyliden ("Saran"), or plastic of similar acoustic properties. However, the cylinder 10 need not be hollow, but may alternatively be filled with a material, such as, for example, an epoxy resin.

In preferred arrangement, the material of the body 10 may be characterized by a specific acoustic resistance which is less than half that of the head 9. For this reason, the combination of a probe-head comprising stainless steel with a body portion of polyvinyliden ("Saran") gives excellent sensitivity. But the use of a metal head for the probe 8 may not be practical because of the corrosive nature of the liquid under test.

The signal lead 14 connected to the lower electrode of transducer wafer 15 passes along the central axis of the body cylinder 10, and out through an insulating bushing 18 of nylon or the like set in the base-plate 11. Lead 13 from the upper electrode of transducer wafe 15 is grounded on the base-plate 11. Lead 14 is connected to the central lead 16 of a coaxial cable having a grounded shield 17, which leads to the amplifier and meter circuits 19 and 22 which are powered by a voltage regulated power circuit 23, all of which are shown in detail in the circuit schematic of FIG. 4, which will be described hereinafter.

A modified embodiment is shown in FIG. 5 of the drawings, which indicates in longitudinal section a rubber-lined steel pipe-section 1', of one and one-half inch inner diameter coupled by means of reducers 20' and 21' into a pipe system of one inch inner diameter, unlined pipe. Dimensions of an embodiment according to FIG. 5, which was actually built and tested, are given in Table I, column C, where a comparison can be had with embodiments A and B built according to FIGS. 2 and 3.

Referring to FIG. 5, the one-quarter of an inch thick rubber lining 3' is held in place against the inner surface of the steel pipe shell 2' by means of flanged rings, not shown, at each end of section 1'. In a position approximately midway between the two ends of pipe-section 1', a probe 8' is screwed directly into a screw-fitting in the outer steel pipe shell 2'. The head 9' of transducer 8' comprises a piezoelectric crystal wafer 15' only one-eighth of an inch in diameter, which is protected by a thin coating, one to thirty mils thick, of epoxy resin, or a similar acoustic coupling material, which forms a tough, resilient coating which readily conducts compressional waves. This may be dipped, painted, or sprayed onto the piezoelectric wafer. Before a protective coating is applied, electrodes may be evaporated onto the opposite surfaces of the tiny wafer 15', or, alternatively, a conducting epoxy resin, containing comminuted silver or other conducting particles may be used on both surfaces, making additional electrodes unnecessary.

The head 9' is supported on a body comprising a cylindrical metal shell having an outside diameter several times that of the wafer 15'. This is broadened out at the base to form a screw which fits into the screw-fitting 4' in the outer metal shell 2' of the principal pipe-section 1'. A round opening in the rubber lining 3' which is an inch or so in diameter, accommodates the probe assemblage 9'. The body portion 10' of probe 9', may be left hollow, or may be filled with epoxy resin, or the like, an airpocket of from one mil to one-eighth of an inch being left beneath the under face of the piezoelectric wafer 15' in the latter case. The output leads 14' and 13' are held in position by the epoxy, the signal lead 14' passing from the under electrode of element 15' along the axis of body 10' and out through an insulating bushing 18' of nylon or the like; and, the lead 13' passing from the upper electrode to ground connection on the metal outer shell 2' of pipe-section 1'. As in the embodiment described with reference to FIGS. 2 and 3, the leads 13' and 14' connect to the center and ground leads of a coaxial connector, corresponding, for example, to leads 16 and 17 as indicated in FIGURE 2. This carries the signal to the amplifier and meter circuits which are connected together with a power circuit in the manner of amplifier, meter, and power circuits 19, 22, and 23 of FIGS. 2 and 3.

In addition to the specific embodiments described, it will be apparent to those skilled in the art that numerous modifications are possible within the scope of the invention. For example, instead of the piezoelectric wafer 15 shown and described with reference to the illustrative embodiments of FIGS. 2, 3, and 5, a magnetostrictive element of any of the forms well-known in the art, designed to respond to longitudinal vibrations, may be substituted therefor. Furthermore, although the heads 9, 9' in the embodiments described have been indicated as having flat surfaces in contact with the passing fluid, the flat shaping is not necessarily critical, increased response having been attained in some experiments when the surface presented to the flowing fluid was made convex.

*Table 1.—Illustrative embodiments, FIGS. 2, 3 and 5*

|  | A | B | C |
|---|---|---|---|
| Pipe shell 2, 2': |  |  |  |
|   Material | Steel | Steel | Steel. |
|   Inner diameter | 6" | 6" | 1.5". |
|   Thickness | .6" | .5" | .179"–.250". |
|   Section length | 16" | 18" | 12". |
| Pipe lining 3, 3': |  |  |  |
|   Material | Polyvinyliden ("Saran"). | Rubber | Rubber. |
|   Thickness | 3/16" | 1/4" | 1/4". |
| Probe 8, 8': |  |  |  |
|   Construction | Figs. 2 and 3 | Figs. 2 and 3 | Fig. 5. |
|   Transducer 15, 15' | Lead titanate zirconate (ceramic). | Same as A | Same as A. |
|   Diameter | 1" | 1" | 1/8". |
|   Thickness | .125"–.375" | .125"–.375" | .125"–.250". |
| Head 9, 9': |  |  |  |
|   Material | Polyvinyliden ("Saran"). | Same as A | Epoxy. |
|   Diameter | 1¾" | 1¾" | 3/8". |
|   Thickness | .0005"–.1" | .0005"–.1" | .001"–.030". |
| Body 10, 10': |  |  |  |
|   Form and material | Polyvinyliden pipe. | Same as A | Metal shell, epoxy filled. |
|   Outer diameter | 2" | 2" | 1". |
| Probe mounting: |  |  |  |
|   Form | T-pipe section 5 | Same as A | Directly in wall of pipe 2. |
| T-section 5: |  |  |  |
|   Lining material | Polyvinyliden ("Saran"). | (Unlined) steel |  |
|   Lining thickness | 3/16" |  |  |
|   Inner diameter | 2 5/8" | 3" |  |
|   Length flange 6 | 4¾" | 4¾" |  |
|   Thickness | .5" | .5" |  |
|   Diameter | 5" | 5" |  |
| Base-plate 11: |  |  |  |
|   Material | Steel | Steel |  |
|   Thickness | .5" | .5" |  |
|   Diameter | 5" | 5"+ |  |
| Lining 12: |  |  |  |
|   Material | Polyvinyliden ("Saran"). | Same as A |  |
|   Thickness | 3/16" | .5" |  |
|   Diameter | 5" | 5"+ |  |
| Adjustable screw | In base-plate | Same as A | In pipe wall. |
| Fitting for probe 8 | do | do | Do. |

Referring to FIG. 4 of the drawings, circuit 19 is a high-gain, resistance-capacitance coupled noise amplifier. Five amplifier stages precede a dual-diode rectifier and filter circuit, the integrated, rectified direct current output of which is impressed on the grid of a cathode-follower circuit which drives recording and indicating devices.

The noise signal picked up by the probe assembly 8 of FIGS. 2 and 3 is impressed between the signal lead 14 and ground lead 13 of the piezoelectric element 15, which in turn, are connected to the center lead 16 and the grounded shield 17 of a coaxial conductor leading to the amplifier circuit 19.

The signal lead 16 and grounded shield 17 of the coaxial conductor are connected across a 250,000 ohm, two watt carbon potential divider 24, the slider of which is connected to the grid 28 of triode 25. Plate 26 of the latter is energized at 163 volts positive by connection to the 273 volt positive direct current output lead of the power circuit 23 through the 4700 ohm, one watt carbon resistor 31, and the 15,000 ohm, two watt carbon resistor 30, connected in series. The junction between resistors 30 and 31 is connected to ground through the 20 microfarad, 450 volt capacitor 32, which serves to reduce any variations in the direct current plate supply. The cathode 27 of triode 25 is maintained at a positive potential of 1.3 volts by connection through the 220 ohm, half-watt carbon resistor 33 to ground.

The output signal from triode 25 is applied to the grid 39 of the triode 36, in the second amplifier stage, through a 0.02 microfarad, 600 volt coupling capacitor 34, across the 220,000 ohm, half-watt carbon resistor 35 connected from grid 39 to ground. Plate 37 of triode 36 is energized to 143 volts positive by connection to the 273 volt positive output lead from power circuit 23 through the 4700 ohm, one watt carbon resistor 42 and the 15,000 ohm, two watt carbon resistor 40. As in the previous stage, the junction between resistors 40 and 42 is connected to ground through the 20 microfarad, 450 volt capacitor 41, which serves to reduce variation in the plate supply to the second amplifier stage. Cathode 38 of tube 36 is maintained at 1.3 volts positive by connection to ground through a 220 ohm, half-watt carbon resistor 43.

The amplified signal from the first two stages is impressed on the grid 49 of triode 46 in the third stage through the 0.02 microfarad, 600 volt coupling capacitor 44, grid 49 being connected to ground through the 220,000 ohm, half-watt carbon resistor 45. Plate 47 of triode 46 is positively energized at 230 volts by connection to the 273 volt output lead of power source 23 through the 39,000 ohm, two watt carbon resistor 50. Cathode 48 of triode 46 is maintained at 1.6 volts positive by connection to ground through the 1500 ohm, half-watt carbon resistor 51.

The amplified output signal from triode 46 in the third stage is impressed on the grid 58 of triode 55 in the fourth stage through the 0.02 microfarad, 600 volt coupling capacitor 53, the grid 58 being connected through the 220,000 ohm, half-watt carbon resistor 54 to the negative 47 volt terminal of power circuit 23. Plate 56 of triode 55 is energized to a potential of 225 volts positive by connection through the 39,000 ohm, two watt carbon resistor 59 to the 273 volt positive output terminal of power source 23. Cathode 57 of tube 55 is maintained at a negative potential of 45.3 volts by connection through the 1500 ohm, half-watt resistor 60, to the negative 47 volt terminal of power circuit 23.

The substantially amplified signal from amplifier stage four is impressed on grid 67 of triode 64 of stage five through the 0.02 microfarad, 600 volt coupling capacitor 62, across the 220,000 ohm, half-watt carbon resistor 63, which connects grid 67 to ground. Plate 65 of triode 64 is positively energized to 270 volts by connection from the 273 volt positive power lead through the 8200 ohm, two watt carbon resistor 68. Cathode 66 of tube 64 is maintained at a positive potential of 3.1 volts by connection through the 8200 ohm, two watt carbon resistor 73 to ground.

The function of the foregoing stages has been one of merely amplification, without substantially changing the character of the random-frequency alternating current noise signal initially picked up by the probe 8. The next stage comprises a double-diode rectifier tube 74 which functions to derive a direct current component from the amplified noise signal diverted from previous stages. Plate 65 of triode 64 is coupled through the 0.1 microfarad, 600 volt coupling capacitor 70 to the plate 75 of diode 74. Plate 75 is connected to ground through the 470,000 ohm, half-watt carbon resistor 72, and is thereby maintained at a negative potential of 0.5 volt; whereas its twin plate 76 which is coupled to cathode 66 of triode 64 through the 0.1 microfarad, 600 volt coupling condenser 71, is connected to ground through a similar 470,000 ohm resistor 69, and thereby maintained at a negative potential of 1.0 volt. The two cathodes 77 and 78 of dual-diode 74 are connected together, the rectified signal output thereof being impressed on a filter circuit which serves to smoothe out and integrate it into a steady direct current signal. The filter consists of a 470 ohm, half-watt carbon resistor 79 connected directly to the junction of the two cathodes, and a pair of two microfarad, 50 volt capacitors 80 and 81, respectively connected at opposite terminals of resistor 79 to ground. The output terminal of resistor 79 is connected through the 250,000 ohm, two watt carbon potential divider 82 to ground, the slider 83 of the latter being connected through the 470,000 ohm, half-watt carbon resistor 84 to grid 90, the latter being connected to ground through the 470,000 ohm, half-watt carbon resistor 86. Grid 90 is biased negatively 12 volts by connection through the 470,000 ohm, half-watt carbon resistor 85 to the slider 132 on potential divider 131 in power circuit 23. Plate 88 of triode 87 is maintained at the desired positive potential by connection to slider 93 which moves over a potential divider consisting of the 25,000 ohm, two watt carbon resistor 91 connected in series with an identical resistor 92 between the 273 volt positive power tap and ground. Capacitor 94 provides an alternating current path between the plate 88 and ground. Cathode 89 is connected to ground through the 500 ohm, two watt carbon potential divider 95, the slider 96 thereon being adapted for connection across the terminals of a recorder circuit 100, which may be utilized for calibration purposes, or to make a permanent record of the output current.

Meter 99, which has a range of from zero to 25 micro-amperes direct current, may either be calibrated to read velocity as a linear function of output current, or alternatively, may be calibrated to read in terms of mass flow. This is connected with one terminal to ground and the other terminal to slider 98 which rides on the 100,000 ohm, two watt carbon potential divider 97, one terminal of which is connected to cathode 89.

An important factor in the proper functioning of the flowmeter of the present invention is the provision of a source of substantially constant, voltage-regulated direct current power. For the purposes of the present illustrative embodiment, it has been found desirable to provide a 273 volt positive direct current plate supply which varies 0.01 millivolt or less.

The direct current for the heater and plate and the negative bias supply are furnished by the power pack 23, which is designed to be plugged in a conventional 117 volt, 60 cycle source through leads 101 and 102, which may be disconnected by the single-throw switch 103.

Directly across the alternating current source are the power transformer 110 and the filament regulator transformer 104. The latter steps down the voltage to 6.3 volts alternating current, to energize the heaters, of which 105 operates the triodes 25 and 36, 106 operates triodes 46 and 55, 107 operates triodes 64 and 87, and 108 operates dual-diode 74, all of which are in amplifier circuit 19 and recorder circuit 22.

For convenience, a pilot light 109 is placed across the primary 111 of iron-cored power transformer 110, the secondary of which has two separate coils, center-tapped coil 112 across which is developed a voltage of ±330 volts and auxiliary coil 113 which is connected across the filament-cathode 116 of the full-wave rectifier 114. Twin anodes 115a and 115b of rectifier 114 are connected to the two terminals of coil 112, whereas the center-tap 117 thereof is connected to the negative terminal of a pi-section filter array. The later includes a pair of iron-cored chokes, 119 and 121, each having an inductance of 10.5 henrys, connected in series to the filament cathode 116 of rectifier 114, and three identical capacitors, 118, 120 and 122, each of 20 microfarads, 450 volts, which are respectively connected across the line at each of the terminals and center of the filter array. At the output end of the rectifier, the 340 volt power supply has a 120 cycle ripple with a peak-to-peak variation of 0.12 volt. At the output terminal of the pi-section filter, the 320 volt supply has a ripple with 60 cycle and 120 cycle components, and a peak-to-peak variation of 0.02 millivolt. The 320 volt power supply is further regulated by connection across a potential divider circuit which includes the 25,000 ohm, 25 watt adjustable wire-wound resistor 124, on the positive side to ground, and a 500 ohm, 25 watt adjustable wire-wound resistor 125, on the negative side to ground. Moreover, three Zener diodes, 127, 128, and 129 are connected in series with the 5000 ohm, 25 watt adjustable wire-wound resistor 126 between the positive terminal of resistor 124 and ground. On the negative side, a Zener diode 130 is connected to ground in parallel with resistor 125 and the 250,000 ohm, two watt carbon potential divider 131. These Zener diodes operate to further regulate the positive and negative output voltages, so that on the positive side there is available 273 volts having a slight 60 cycle ripple, the direct current output varying about 0.01 millivolt; and on the negative side 47 volts is available having a similar characteristic. The positive power supply is connected through lead 135 to energize the plate circuits in amplifier 19, and indicator circuit 22. A negative biasing supply of 47 volts is connected through lead 123 to the cathode and grid circuits of the fourth stage of amplifier 19. Negative biasing voltage is also available by connector to slider 132 which moves on potential divider 131 to furnish a negative bias of 12 volts to grid 90 of tube 87 in the indicating circuit. The eight microfarad, 150 volt capacitor 134 connects the aforesaid slider to ground.

The present invention has been tested and found to operate satisfactorily using a number of different types of fluid, including water, motor oil grade S.A.E. 40, and a ten percent solution of sulphuric acid.

Each time a different fluid is used, the meter 99 is first calibrated by running a known quantity through at a known rate, the slider 93 on the potential divider 91 in the indicator circuit being adjusted so that the meter 99 reads zero for a condition of no flow, and gives full scale deflection at a desired maximum. If a continuous record of the velocity of flow is desired, a recorder 100 of one of the forms well-known in the art is connected across the output, and after proper calibration, by means of slider 96 on potential divider 95, a pen or stylus moves up and down in accordance with variations in the output current, making a permanent record on a moving chart which unrolls beneath it.

Moreover, in the cases of liquids which are pumped into the conduit system at a substantially constant pressure, and wherein the pipe-section 1, 1' is filled completely, or in which the liquid is maintained at a preselected level in the pipe, the meter may be readily calibrated in terms of mass flow. In any case, where either velocity or mass flow is measured, in order to insure accurate readings, the flow should be maintained at a level sufficient to cover the interposed probe 8, 8'.

In operating the flowmeter of the present invention, increased sensitivity has been attained by screwing the probe 8, 8' into the center of the pipe.

Confirming the theory previously set forth, experiments have shown that the slopes of the calibration curves plotted from tests of different types of fluid by flowmeters of the present invention vary as a function of the viscosity of the fluid under test, increasing as the viscosity increases.

Figure 6:
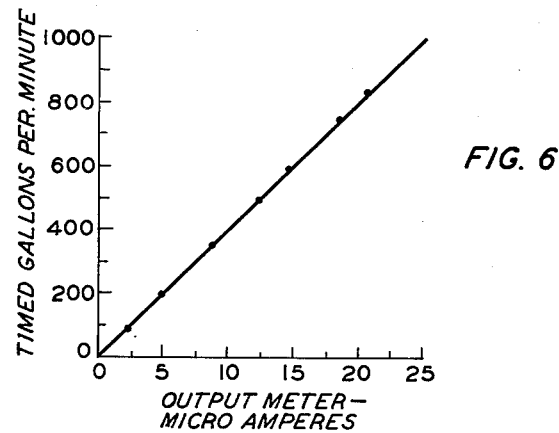
FIG. 6 is a calibration curve for a flowmeter in accordance with the present invention, including a six-inch diameter rubber-lined flow-pipe.
Figure 7:
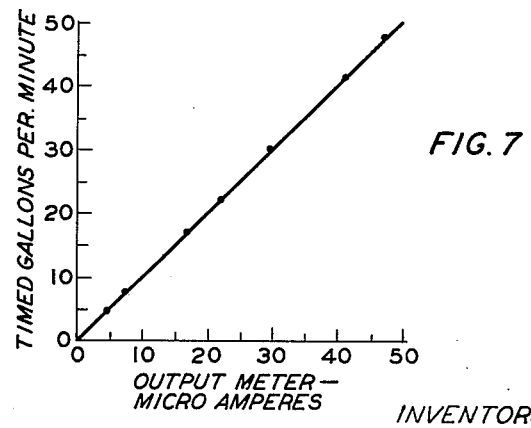
FIG. 7 is a calibration curve for a flowmeter in accordance with the present invention including a one-inch diameter rubber-lined flow-pipe.

Examples of calibration curves plotted from actual tests of flowmeters designed in accordance with the present invention are shown in FIGS. 6 and 7 of the drawings. In both of these tests, the flowmeters, which were interposed in water conduit systems, included rubber-lined pipe-sections, the general design of the components being substantially as shown and described with reference to FIGS. 2 and 3.

FIG. 6 shows timed gallons-per-minute plotted against microampere meter readings, utilizing a six-inch inner diameter steel pipe having a quarter-inch rubber lining for the flowmeter section. The probe 8 was adjusted to protrude a radial distance of about one-sixteenth of an inch from the inner surface of the rubber lining 3. Seven microammeter readings were taken, beginning at a timed flow of 100 gallons-per-minute, and ending at 840 gallons-per-minute. Although the curve has been extrapolated to zero at the lower end and to 1000 gallons-per-minute at the upper end, it will be understood that the area in the immediate vicinity of zero has not been fully investigated. Readings were taken at an outdoor test site in the ambient atmosphere, with temperatures varying from five to 25 degrees centigrade.

FIG. 7 shows results of a similar test made under ambient conditions of temperature and pressure on a water conduit system at an indoor site. In that test, the flowmeter included a steel shell having a one and one-half inch inner diameter, and a quarter-inch rubber lining. In this case, the probe was interposed a radial distance of about one-thirty second of an inch from the inner surface of pipe lining 2. In FIG. 7, timed gallons-per-minute are plotted against microampere readings. Eight readings were taken, including an initial reading of five gallons-per-minute, and a final reading of 48 gallons-per-minute, the curve being extrapolated at the ends.

From the foregoing curves, the linear response of the flowmeter of the present invention is evident.

In order to illustrate the principles of the present invention, several specific embodiments thereof have been described with particularity, and a number of possible modifications of each have been pointed out. It will be understood, however, that the present invention is not limited to any of the specific forms described in detail or indicated, but may assume numerous variations within the scope of the appended claims.

What we claim is:

1. A flowmeter for measuring the velocity of fluid flowing in a conduit which comprises in combination a pipe-section interposed to receive the flow in said conduit, a probe having a roughened end surface mounted in an inner wall of said pipe-section, said probe including a transducer acoustically coupled to said end surface and responsive to random frequency noise generated by the shearing action of said fluid as it flows in contact with said roughened end surface to produce an electrical signal, circuit means including an amplifier, rectifier, and indicator coupled to receive the signal from said transducer, amplify and rectify said signal, and produce a reading on said indicator which is a substantially linear function of the velocity of fluid flowing in said conduit.

2. A flowmeter for measuring the velocity of fluid flowing in a conduit which comprises in combination a pipe-section interposed to receive the flow in said conduit, a transducer including a protective coating presenting a roughened end surface mounted in an inner wall of said pipe-section, said roughened end surface in contact with the fluid in said pipe, said transducer responsive to noise generated by the shearing action of said fluid as it flows in contact with said roughened end surface to produce an electrical signal, means for isolating said transducer from spurious noises generated in said pipe-section which includes a lining overlaying the inner surface of said pipe-section, the material of said lining having a specific acoustic resistance which is less than one-half that of the material of said pipe-section, circuit means coupled to said transducer including an amplifier, rectifier, and filter for amplifying, rectifying, and integrating the signal derived from said transducer, and indicating means responsive to the output of said circuit means for producing a reading which is substantially a linear function of the velocity of fluid flowing in said conduit.

3. A flowmeter for measuring the velocity of fluid flowing in a conduit which comprises in combination a pipe-section interposed to receive the flow in said conduit, a transducer including a protective coating having a roughened end surface mounted in an inner wall of said pipe-section and responsive to random frequency noise generated by the shearing action of said fluid as it flows in contact with said roughened end surface to produce an electrical signal, means for isolating said transducer from spurious noises generated in said pipe-section including a lining overlaying the inner surface of said pipe-section, the said lining comprising a viscoelastic material, circuit means connected to said transducer for detecting the signal from said transducer, and indicating means coupled to said circuit means for indicating the velocity of fluid flow in said conduit as a function of the output of said circuit means.

4. A flowmeter for measuring the velocity of fluid flowing in a conduit which comprises in combination a pipe-section interposed to receive the flow in said conduit, a probe having a roughened end surface mounted in an inner wall of said pipe-section, means for manually adjusting the degree to which said end surface projects into said pipe-section in a radial direction in contact with the fluid flowing in said pipe-section, said probe including a transducer coupled to said end surface and responsive to random frequency noise generated by the shearing action of said fluid as it flows in contact with said roughened end surface to produce an electrical signal, circuit means electrically coupled to said transducer for detecting the signal produced by said transducer, and electrical indicating means coupled to said circuit means for indicating the velocity of fluid flow in said conduit as a function of the output of said circuit means.

5. A flowmeter for measuring the velocity of fluid flowing in a conduit which comprises in combination a fluid-tight pipe-section interposed to receive the flow in said conduit, said pipe-section constructed to include a T-section intermediate between its ends, a probe mounted in said T-section and including a head having a roughened end surface in contact with said fluid, said head including an electroacoustic transducer responsive to random frequency noise generated by the shearing action of said fluid as it flows in contact with the roughened end surface of said head, circuit means connected to said transducer for detecting and integrating the signal from said transducer, and indicating means coupled to said circuit means for indicating the velocity of fluid flow in said conduit as a substantially linear function of the output of said circuit means.

6. A flowmeter for measuring the velocity of fluid flowing in a conduit which comprises in combination a pipe-section interposed to receive the flow in said conduit, said pipe-section constructed to include a T-section intermediate between its ends, a probe mounted in said T-section, said probe including a cylindrical body having a hollow chamber closed by a head having a roughened end surface in contact with said fluid, a piezoelectric wafer bonded in acoustic coupling relation to the underside of said head and responsive to the noise generated by said fluid flowing in contact with said roughened end surface to generate an electrical signal, circuit means coupled to said piezoelectric wafer for amplifying, rectifying, and integrating the signal derived from said piezoelectric wafer, and indicating means for indicating the velocity of fluid flow in said conduit as a substantially linear function of the output of said circuit means.

7. A combination in accordance with claim 6 wherein said pipe-section is lined with a material having a specific acoustic resistance less than half that of said pipe-section.

8. A combination in accordance with claim 7 wherein said pipe-section is lined with a material having a specific acoustic resistance less than one-tenth that of said pipe-section.

9. A combination in accordance with claim 6 wherein the end surface of said probe head in contact with said fluid is roughened to increase its Reynolds number to in excess of about 2000.

10. A combination in accordance with claim 6 wherein said probe head comprises a viscoelastic plastic material.

11. A combination in accordance with claim 6 wherein said probe head comprises stainless steel.

12. A combination in accordance with claim 6 wherein the specific acoustic resistance of the material of the body of said probe is less than half that of the material of the head of said probe.

13. A combination in accordance with claim 6 wherein said probe is projected about 0.01 inch in a radial direction beyond the inner surface of said pipe-section.

14. A combination in accordance with claim 6 wherein said probe is slightly recessed with reference to the inner surface of said pipe-section.

15. A combination in accordance with claim 6 wherein said fluid contains a corrosive component, and said pipe-section and said T-section are both lined with a viscoelastic material which is resistant to the corrosive action of said component, and wherein the head and body of said probe in contact with said fluid are formed of materials which are resistant to the corrosive action of said component.

16. A flowmeter for measuring the velocity of fluid flowing in a conduit which comprises in combination a pipe-section interposed to receive the flow in said conduit, a probe having a head in contact with the fluid flowing in said pipe-section and a body directly connected in a fluid-tight mounting in the inner wall of said pipe-section, said head comprising a piezoelectric wafer protected on the surface thereof in contact with said fluid by a tough resilient roughened outer coating characterized by a high coefficient of coupling for compressional waves whereby the shearing action of said fluid in contact with said roughened outer coating generates a noise signal to which said piezoelectric wafer is responsive to generate a corresponding electric signal, circuit means coupled to said piezoelectric wafer for amplifying, rectifying, and integrating the signal derived from said piezoelectric wafer, and indicating means for indicating the velocity of fluid flow in said conduit as a substantially linear function of the output of said circuit means.

17. A combination in accordance with claim 16 wherein said pipe-section is lined with a material having a specific acoustic resistance which is less than half of that of the principal material of said pipe.

18. A combination in accordance with claim 17 wherein said pipe-section is lined with a viscoelastic material.

19. A combination in accordance with claim 16 wherein the outer coating of said probe-head in contact with said fluid is roughened to increase its Reynolds number to in excess of about 2000.

20. A combination in accordance with claim 16 wherein said piezoelectric wafer is protected on the surface adjacent said flowing fluid by a coating of epoxy resin, and wherein the body of said probe comprises a metal shell at least partially filled up with epoxy resin.

21. A combination in accordance with claim 16 wherein said probe is projected about 0.01 inch in a radial direction beyond the inner surface of said pipe-section.

(References on following page)

References Cited by the Examiner

UNITED STATES PATENTS

| | | | |
|---|---|---|---|
| 2,492,371 | 12/1949 | Sivian | 73—194 |
| 2,708,366 | 5/1955 | Blocker et al. | 73—194 |
| 2,760,184 | 8/1956 | Beattie | 73—194 |
| 2,912,856 | 11/1959 | Kritz | 73—194 |
| 2,936,619 | 5/1960 | Gibney | 73—194 |
| 3,078,709 | 2/1963 | Clark | 73—194 |

RICHARD C. QUEISSER, *Primary Examiner.*

ROBERT L. EVANS, *Examiner.*